April 25, 1944. J. STEIGER 2,347,521
DEVICE FOR REDUCING TORSIONAL OSCILLATIONS
Filed Dec. 12, 1941 2 Sheets-Sheet 1

INVENTOR
Jacques Steiger
BY
ATTORNEYS

April 25, 1944. J. STEIGER 2,347,521
DEVICE FOR REDUCING TORSIONAL OSCILLATIONS
Filed Dec. 12, 1941 2 Sheets-Sheet 2
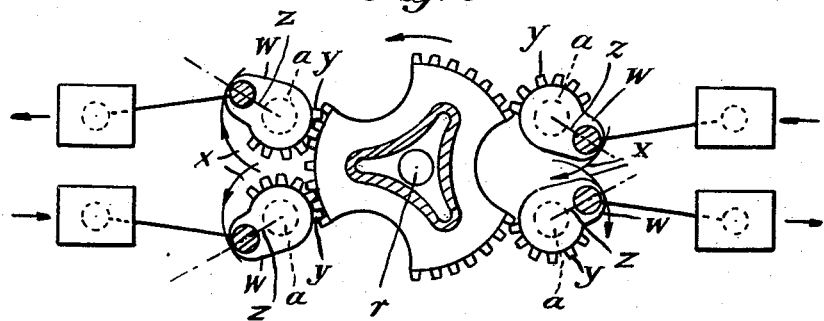
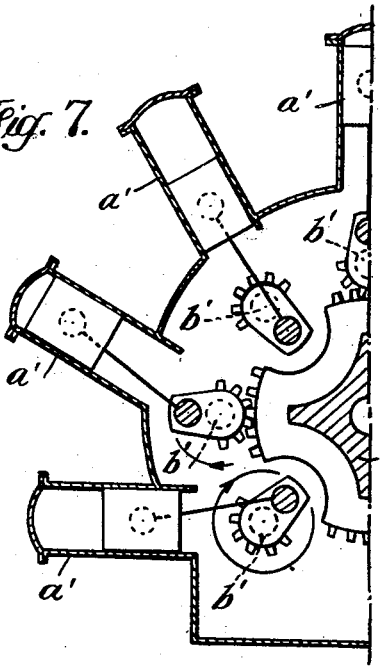
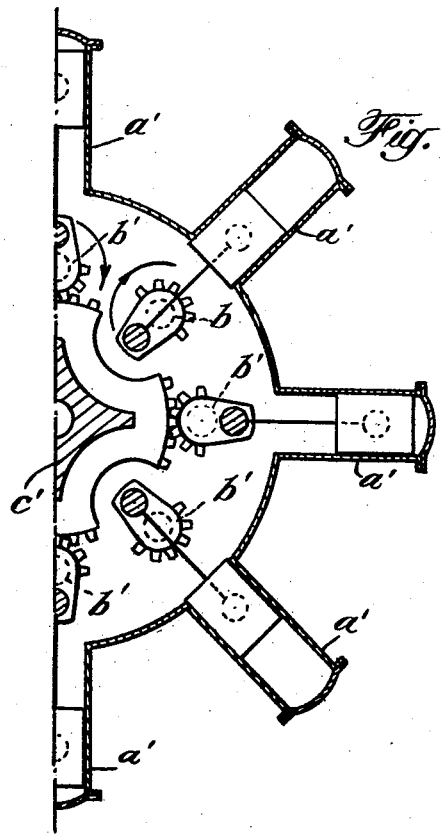
INVENTOR
Jacques Steiger
BY
ATTORNEYS Patented Apr. 25, 1944

2,347,521

UNITED STATES PATENT OFFICE 2,347,521

DEVICE FOR REDUCING TORSIONAL OSCILLATIONS

Jacques Steiger, Winterthur, Switzerland, assignor to Sulzer Frères Société Anonyme, Winterthur, Switzerland Application December 12, 1941, Serial No. 422,610
In Switzerland February 12, 1941

7 Claims. (Cl. 74—603)

The invention relates to a device for reducing the torsional oscillations of crankshafts, particularly of high-speed reciprocating engines.

Crankshafts, particularly those of high-speed multi-cylinder engines, are subject to dangerous torsional oscillations. It is known, first to adopt additional devices for damping or for producing counter-harmonic forces, secondly to adopt a certain setting of the crankshaft to reduce the resulting harmonic forces, and thirdly to endeavour to increase the natural frequency by thickening the crankshaft or by reducing the masses in the running gear.

The possibility of reducing the rotating masses is very limited from reasons of strength, and the thickening of the crankshaft is also limited from constructional reasons.

The thickening of the crankshaft necessitates a further increasing of the masses, which will partly eliminate the advantage obtained by thickening the shaft. Changes in the relative displacement of the cranks do not increase the natural frequency; improving the conditions with respect to one order of forces very often entails worsening the conditions of neighbouring orders of forces.

The invention consists in that, besides the crankshaft, a shaft connected positively with it is provided, whose natural frequency is higher than that of the crankshaft. Thereby the advantages are obtained that the elasticities are reduced and the natural frequency increased, and stiffening of the crankshaft is obtained without its being thickened. As positive connection between the two shafts, toothed wheels will be found advantageous. As long as the power is directly given to or taken from the crankshaft, the diameters chosen for the pitch circles of the toothed wheels on the crankshaft or on the second shaft depend only on the desired degree of stiffening.

The crankshaft end of a crank-cheek may be fitted with teeth which mesh with teeth arranged on the second shaft, the latter having one or more recesses for allowing the crankpin end of the cheeks to pass through, so that the speed of the second shaft can be reduced without greatly affecting the natural frequencies. In this way the further advantage is obtained that the distance of the crankshafts from each other and from the second shaft, and also the diameter of the toothed wheel of the second shaft, are not unnecessarilly great and there is no excessive weight in the second shaft to partly counterbalance the advantage obtained from the reduced elasticity. The teeth on the shaft end of the crank-cheek will then advantageously extend over an angle of more than 180°. Since one crank is connected direct to the second shaft only during one of its strokes, it is best to have this connection during the heavily loaded stroke, so that during the other stroke the power is transmitted by the neighbouring cranks to the second shaft.

The recesses in the rows of teeth of the second shaft require that the speed ratios are integral and not fractional, i. e. 1:1, 1:2, 1:3, etc.

In engines with several rows of cylinders and several crankshafts, two or more crankshafts may be connected to the second shaft, whereby the advantage is obtained that the pitch circle diameter of the teeth and also the masses of the shafts are still further reduced. The cranks of two crankshafts may be displaced in such a way that the resulting force of one harmonic order of oscillations of one crankshaft may eliminate, approximately or altogether, the resulting force of the same harmonic order of oscillations of the other crankshaft. If necessary, by displacing the cranks, the remaining free forces and moments of the two crankshafts may be made to compensate each other.

In order to insert the second shaft as a member in a line of shafting, or to arrange several groups of engines in series one behind the other, the second shaft may be provided with coupling halves at both ends. The second shaft may have a central bore of such a size that a flexible shaft transmitting the power may be arranged within the bore.

In the drawing several examples of execution of the subject matter of the invention are diagrammatically illustrated.

Fig. 6 show several crankshafts arranged round one second shaft, the crank circles overlapping each other.

Fig. 7 illustrates a star engine with stationary cylinders and rotating second shaft, and Fig. 8 a star engine with rotating cylinders and stationary second shaft.

Figure 1:
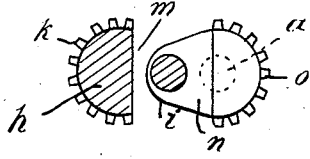
Figs. 1 to 3 show crankshafts with power transmission and speed reduction 1:1, 1:2, 1:3 through the second shaft.
Figure 2:
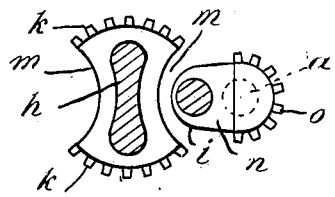
Figure 3:
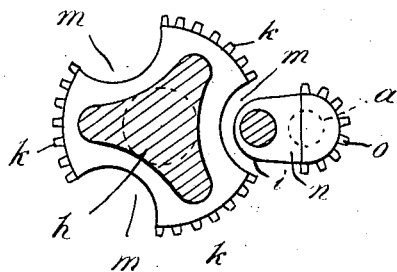

In order to avoid the drawback of the masses becoming too great, the distance of the crankshaft $a$ from the second shaft $h$ in Figs. 1 to 3 is diminished, so that the crank $i$ comes within the space occupied by the teeth $k$ of the second shaft $h$, and these teeth $k$ must then be provided with recesses $m$ to allow a free passage for the cranks $i$ and the connecting rods, which are not shown. The crank-cheeks $n$ of the cranks $i$ are provided with teeth $o$ only at their ends next the shaft, and these teeth extend over an angle of somewhat more than 180° and mesh intermittently with the teeth $k$ of the second shaft $h$. In order that the meshing may not be interrupted, the crankshaft $a$ must have at least two cranks $i$ displaced at 180°, or be connected to the second shaft $h$ by means of toothed wheel gearing at a place near the cranks $i$, or at the end.

With the change-speed ratio 1:1 in Fig. 1, one recess $m$ is required; with the change-speed ratios 1:2 and 1:3 in Figs. 2 and 3, two and three recesses respectively are required.

Figure 4:
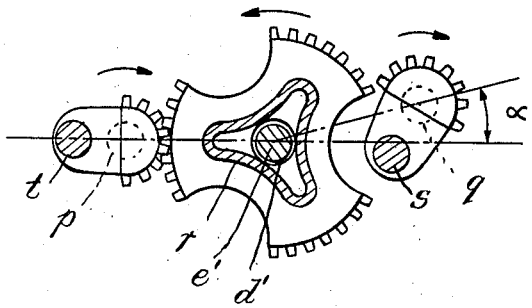

Fig. 4 shows the connection of two crankshafts $p$ and $q$ with a second shaft $r$ and a change-speed ratio of 1:3. The two crankshafts $p$ and $q$ could be set diametrically or displaced at any desired angle to the axis of the second shaft $r$. The drawing shows the crankshaft $q$ displaced by 180°+10°, which causes the crank $s$ to turn 30° behind the crank $t$. The angle $a$, which is 10°, is formed by the horizontal line connecting the centers of crank $p$ and shaft $r$, and the intersecting line connecting shaft $r$ and crank $q$. In this way an harmonic component of the sixth order of crankshaft $q$ is displaced in phase by $6 \times 30 = 180°$ with respect to the harmonic component of the same order of the crankshaft $p$. Consequently the resulting components of the two crankshafts $p$ and $q$ for equal forces become equal to zero, and for unequal forces are diminished to the difference between the two forces.

With the crankshaft $q$ displaced by 180°+5° and with the crank $s$ lagging behind the crank $t$ by 15°, the resultants of the harmonic forces of the 12th order of the two crankshafts $q$ and $p$ can in a similar manner be reduced to zero or to a minimum.

What has been described here for two shafts and a change speed ratio of 1:3 holds also for several shafts with integral change speed ratios, and also for the case in which crankshafts of different kinds, with the same or with different numbers of crankshafts, work together with a common second shaft.

Figure 5:
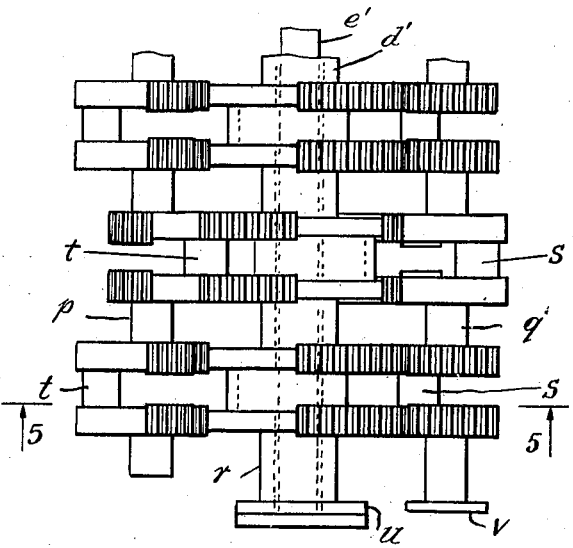
Figs. 4 and 5 show the arrangement of two displaced crankshafts with one second shaft.

In the plan in Fig. 5 with the crankshafts $p$ and $q$ and a common second shaft $r$, power can be transmitted to or from the engine through the coupling flange $u$ of the second shaft $r$, or through the coupling flange $v$ of the crankshaft $q$, or through both simultaneously, according to the manner of working or the class of drive.

In Fig. 6 the cranks $w$ of each of two pairs of crankshafts $a$ lying beside each other are displaced in such a way that their crank circles $x$ overlap each other. The cranks $w$ are connected positively with the second shaft $r$ by the teeth $y$. The teeth $y$ are arranged unsymmetrically with respect to the centre lines $z$ of the cranks $w$, in order to obtain a large toothed sector in spite of the crank circles $x$ overlapping. The overlapping of the crank circles $x$ has the advantage that the distance between each pair of adjacent rows of cylinders can be reduced.

The star engine in Fig. 7 is shown in section. It has several rows of cylinders $a'$, each of which consists of several cylinders arranged in a row behind each other, whereby each has a crankshaft $b'$ and all these crankshafts are positively connected to the second shaft $c'$. The cylinder rows $a'$ with the crankshafts $b'$ are stationary; the second shaft $c'$ rotates.

In contrast to the arrangement in Fig. 7, the rows of cylinders $a'$ with the crankshafts $b'$ in Fig. 8 turn round the stationary second shaft $c'$.

The second shaft $r$ in Figs. 4, 5 and 6 is shown in the drawings as a cast hollow body. The bore $d'$ (Fig. 5) is so large that the flexible shaft $e'$ for transmitting the power can be arranged within the bore. In the other figures the second shaft is assumed to be cast solid or forged from a solid block and made of any material suitable for the toothed wheels.

When the second shaft is fitted in a length of shafting, or is included as a member of a series of engine aggregates, which are the same or similar and are arranged one behind the other, both ends of the second shaft are provided with coupling flanges.

The crankshafts are all assumed to be solid forgings, provided with teeth cut from the solid and made of a material suitable for transmission of power by toothed wheels. The crankshaft used may be built-up or semi built-up. The teeth may also be shrunk on to the crank-cheeks, keyed on or laterally bolted to them. This holds also for the teeth of the second shaft. The material of which the second shaft or its teeth, and also the teeth on the crankshafts, is made is chosen so that all parts have good running qualities. For improving the running qualities, the flanks of the teeth may be heat-treated, hardened, nitrated or chromium-plated.

For marine engine installations the second shaft may be designed as intermediate shaft of the shafting leading from the main engine to the propeller. By adopting a second shaft it is possible, by means of the forementioned arrangement of the second shaft and the consequent possibility of changing speed, to place in the shaft tunnel in the ship through which the shafting passes high-speed internal combustion engines for increasing the output developed by the existing marine engine plant. In consequence of the speed reducing gear and the adoption of high-speed internal combustion engines, the dimensions of such a set can be kept small even when developing great power.

In particular such sets can be simplified in that they are designed as internal combustion engines without any starting devices and possibly also without any regulating device, so that when the main engine is in use, it is only necessary to start the fuel feed to the cylinders of such auxiliary sets. In such an arrangement the main engine may be either a steam engine or an internal combustion engine.

Adopting second shafts is possible not only in the case of prime movers, such as internal combustion engines, but also for driven machines, for instance compressors, in which case the power required for driving these compressors is transmitted from the second shaft to the crankshaft of the compressor.

I claim:

1. In a multi-cylinder reciprocating engine, the improvement which comprises a crankshaft having a crank-pin and a cheek having a circular sector concentric with the axis of rotation of the crankshaft, gear teeth on the circular sector diametrically opposite the crank-pin, a second shaft spaced to one side of the crankshaft and rotatable on an axis parallel with the axis of rotation of the crankshaft, at least one recess in the second shaft to provide clearance for the crank-pin of the crankshaft during rotation of said shafts, at least one circular sector on the second shaft having a gear circumferentially displaced from the recess, the gears of said sectors being similar and arranged to engage each other intermittently during the rotation of said shafts.

2. In an engine according to claim 1, gear teeth on the sector of the crankshaft extending over an angle of at least 180°.

3. An engine according to claim 1 which comprises at least two gear sectors on the crankshaft displaced 180° apart, the gear teeth on each sector extending over an angle of at least 180°.

4. In a multi-cylinder reciprocating engine, the improvement which comprises at least two crankshafts displaced from each other and having their axes of rotation parallel, at least one crank-pin and one crank-check on each crankshaft, a connecting rod attached to said crank-pin, a second shaft mounted between the crankshafts and having its axis of rotation parallel to the axes of rotation of the crankshafts, at least one circular sector on each crankshaft, each circular sector having gear teeth thereon and being concentric with the axis of its crankshaft, the second shaft having a member rotatable therewith provided with at least three recesses forming clearances for the crank-pins and their attached connecting rods and at least three circumferentially spaced circular sectors having gear teeth thereon, said crankshafts, second crankshaft, member, sectors, gear teeth and recesses being constructed and arranged whereby the gear teeth on the crankshafts intermittently engage the gear teeth on the sectors of said member and the crank-pins and their attached connecting rods intermittently clear the recesses.

5. In a multi-cylinder engine according to claim 4, sectors for the crankshafts which have gears extending through an angle of at least 180°.

6. A multi-cylinder engine according to claim 4 in which the axes of rotation of the two crankshafts are substantially diametrically opposite.

7. A multi-cylinder engine according to claim 4 in which the axes of the crankshafts are on opposite sides of the second shaft, in the neighborhood of 180° apart, whereby the crank-pins of two crankshafts are displaced in such a way that the resulting force of one harmonic order of oscillations of one crankshaft substantially eliminates the resulting force of the same harmonic order of oscillations of the other crankshaft.

JACQUES STEIGER.